United States Patent
Scaramucci

[15] 3,666,234
[45] May 30, 1972

[54] SPHERICAL DISC VALVE ASSEMBLY

[72] Inventor: Domer Scaramucci, 3245 South Hattie, Oklahoma City, Okla. 73129

[22] Filed: Aug. 27, 1969

[21] Appl. No.: 853,238

Related U.S. Application Data

[63] Continuation-in-part of Ser. No. 763,644, Sept. 30, 1968, Pat. No. 3,531,081.

[52] U.S. Cl.................251/151, 134/454.2, 251/298, 251/306, 251/315
[51] Int. Cl...................F16k 51/00, F16k 25/00
[58] Field of Search.................166/86, 87, 95, 97; 251/148, 251/291, 292, 298, 306, 315, 316, 175, 174; 137/454.2

[56] References Cited

UNITED STATES PATENTS

| | | | |
|---|---|---|---|
| 2,034,216 | 3/1936 | Stout et al. | 251/175 X |
| 2,789,785 | 4/1957 | Woods | 251/174 |
| 3,083,725 | 4/1963 | Moen | 251/317 X |
| 3,127,909 | 4/1964 | Alamprese | 251/316 X |
| 3,208,472 | 9/1965 | Scaramucci | 137/454.2 |
| 3,491,796 | 1/1970 | Scaramucci | 251/315 |
| 3,497,178 | 2/1970 | Priese | 251/315 X |
| 2,092,261 | 9/1937 | Rector | 251/291 X |
| 2,592,062 | 4/1952 | Perry | 251/315 X |
| 3,081,791 | 3/1963 | Wheatley | 137/454.2 |
| 3,118,465 | 1/1964 | Scaramucci | 137/454.2 |
| 3,245,653 | 4/1966 | Lavigueur | 251/315 X |

*Primary Examiner*—Henry T. Klinksiek
*Attorney*—Dunlap, Laney, Hessin & Dougherty

[57] ABSTRACT

A disc valve assembly, particularly useful between flanges, which utilizes a housing unit and a separate valve unit. The housing unit and the valve unit are adapted so that a minimum contact area is established therebetween. The housing unit provides a supporting housing adapted to be supported between the flanges, and includes a first valve stem. The valve unit is sized to be inserted in the housing unit and includes a disc valve member, a seat and a pair of valve stems. One of the stems is journaled in the valve body and is adapted to be interconnected to the first valve stem, and secured to the disc valve member. The other valve stem is connected to the disc valve member and is journaled in the valve body.

11 Claims, 4 Drawing Figures

PATENTED MAY 30 1972　　3,666,234

INVENTOR
DOMER SCARAMUCCI

BY
Dunlap, Laney, Hessin & Dougherty
ATTORNEYS

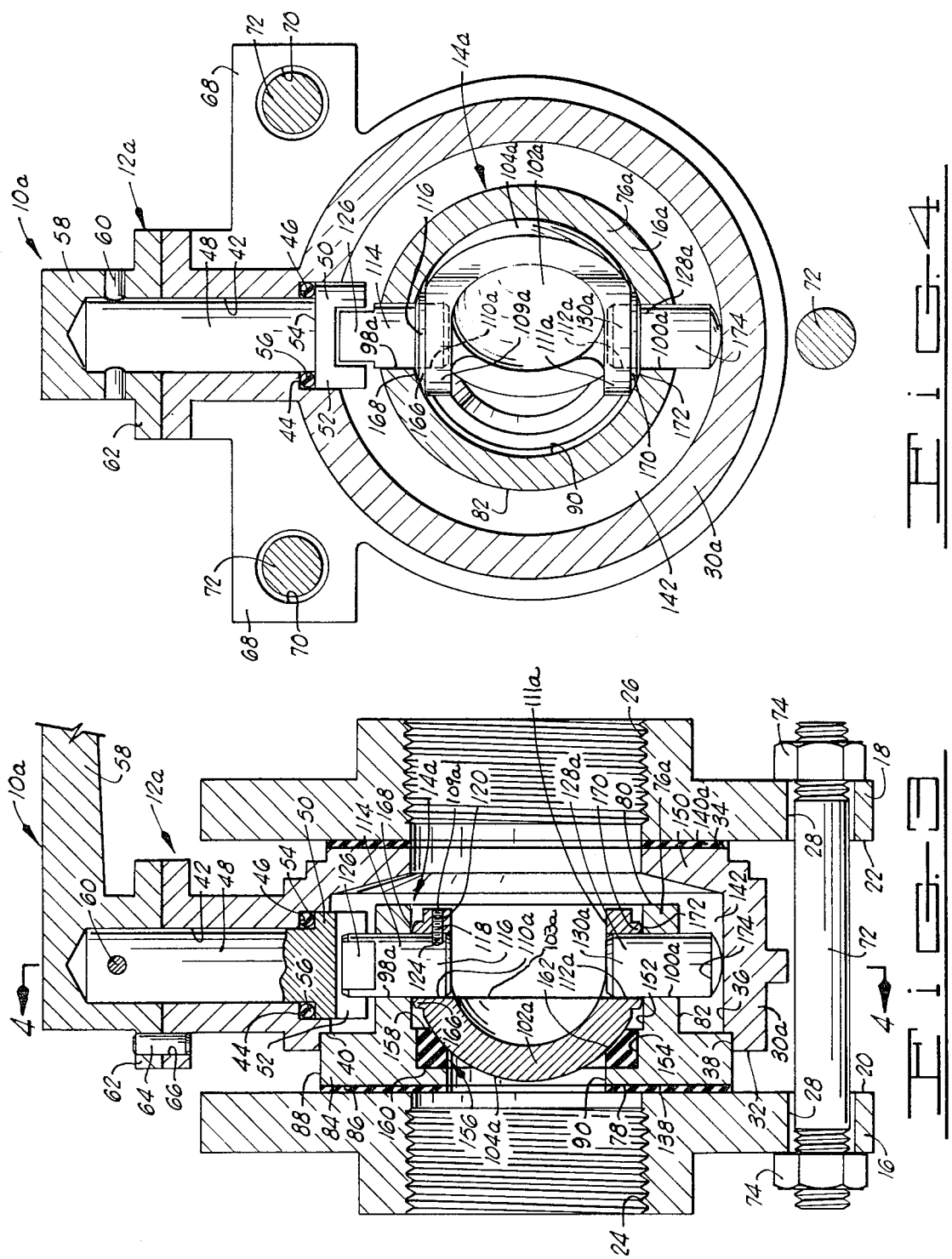

SPHERICAL DISC VALVE ASSEMBLY

CROSS-REFERENCE TO RELATED APPLICATIONS

This application is a continuation-in-part of applicant's co-pending application entitled "Valve Assembly With Insertable Valve Unit," Ser. No. 763,644, filed Sept. 30, 1968, now U.S. Pat. No. 3,531,081.

BACKGROUND OF THE INVENTION

1. Field of the Invention

This invention relates generally to improvements in valve assemblies utilizing a housing unit and a separate valve unit, and more particularly, but not by way of limitation, to an improved disc valve assembly utilizing a housing unit and a separate valve unit.

2. Description of the Prior Art

Applicant's co-pending application, "Valve Assembly with Insertable Valve Unit," Ser. No. 763,644, filed Sept. 30, 1968, disclosed a butterfly valve assembly having a separate housing unit and a separate valve unit. In that disclosure the butterfly valve member was journaled in the valve body using two separate valve stems. The valve unit was insertable in the housing unit, the outer periphery of the valve body being sized to slidingly fit in the housing. There are applications, particularly those involving the control of corrosive fluids, or those where the valve is to be used in a corrosive atmosphere, where it is desirable to maintain the contacting area between the valve unit and the housing to a minimum.

SUMMARY OF THE INVENTION

The present invention contemplates, in one aspect thereof, a valve assembly for controlling the flow of fluid between a pair of aligned pipe flanges interconnected by a plurality of circumferentially spaced bolts. The valve assembly includes a housing having opposite end faces, a bore extending therethrough and adapted to be supported between the flanges by the bolts. A first valve stem having an upper and a lower end is journaled in the housing. A valve unit is supported in the housing, and includes a valve body which is adapted to be inserted lengthwise into the housing. The valve body has opposite ends and a bore extending therethrough intersecting the opposite ends. The outer periphery of the valve body is sized to be less than the inner periphery formed by the bore in the housing. A hollow, substantially hemispherically shaped disc valve member, is supported in the bore of the valve body for opening and closing the valve assembly. A second valve stem is secured to the disc valve member, and has an upper and lower end portion. The second valve stem is journaled in the valve body and the upper end portion thereof is adapted to be connected to the first valve stem to the disc valve member. A seat is provided to form a seal between the valve body and the disc valve member when the disc valve member is in the closed position.

An object of the invention is to facilitate the repair of valve assemblies in the field.

Another object of this invention is to provide a disc valve assembly wherein the cost to manufacture and assemble the parts of the valve assembly is reduced to a minimum, and the valve assembly will have a long service life.

A further object of the invention is to provide a disc valve assembly wherein the disc valve member is positively located and journaled in the valve chamber by a pair of valve stems which are removably connected to the disc valve member.

A still further object of the invention is to provide a disc valve assembly wherein the disc valve member is shaped to provide improved flow characteristics and may be quickly and easily removed.

Another object of the invention is to provide a valve assembly having an insertable valve unit, wherein the contact area between the housing unit and the valve unit is reduced to a minimum to facilitate insertion and removal of the valve unit.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view of a valve assembly, shown in the closed position and assembled between two flanges.

FIG. 2 is a partial sectional view of the valve assembly of FIG. 1, taken substantially along the lines 2—2 of FIG. 1, but showing the disc valve member in elevation and in a partially open position.

FIG. 3 is a view similar to FIG. 1, but illustrating a modified valve assembly.

FIG. 4 is a partial sectional view of the valve assembly of FIG. 3, taken substantially along the lines 4—4 of FIG. 3, but showing the modified valve member in elevation and in a partially open position.

DESCRIPTION OF THE PREFERRED EMBODIMENTS

Referring to the drawings in detail, and to FIGS. 1 and 2 in particular, shown therein and designated by the general reference character 10, is a valve assembly which basically comprises a housing unit 12 and a valve unit 14. The valve assembly 10 is disposed generally between a pair of flanges 16 and 18.

Each of the flanges 16 and 18 includes an end face 20 and 22, and a threaded opening 24 and 26, respectively. The threaded openings 24 and 26 are axially aligned and sized to receive the threaded ends of adjacent sections of a conduit (not shown). Each of the flanges 16 and 18 also includes a plurality of circumferentially spaced apertures 28 extending therethrough.

The housing unit 12 includes a tubular housing 30 having opposite end faces 32 and 34 and a bore 36 extending therethrough. A counterbore 38 is formed in the end 32 of the housing 30, thereby providing an annular wall 40 facing the respective end of the housing 30.

An aperture 42 extends transversely through the housing 30 intersecting the bore 36. A counterbore 44 is formed in the aperture 42 adjacent the bore 36 of the housing 30, thereby providing a downwardly facing surface 46 in the housing 30.

A first valve stem 48 is journaled in the housing 30, and extends through the transversely extending aperture 42. Thus the center line of the first valve stem 48 extends at a right angle to the center line of the bore 36 in the housing 30. The first valve stem 48 includes a lower flange portion 50 having a slot 52 therethrough and being shaped to form an upwardly facing surface 54 encircling the first valve stem 48. The lower portion 50 is sized to slidingly fit in the counterbore 44 of the aperture 42, and in an assembled position, as shown in FIG. 1, the lower flange portion 50 will extend a distance in the counterbore 44.

An O-ring seal member 56 is disposed in the counterbore 44 generally between the downwardly facing surface 46 of the housing 30 and the upwardly facing surface 54 of the lower flange portion 50. In an assembled position, the O-ring seal 56 is compressed between the lower flange portion 50 and the downwardly facing surface 46, and forms a fluid tight seal therebetween. It should be further noted that the engagement of the flange portion 50 of the first valve stem 48 with the surface of the counterbore 44 in the housing 30 will provide a secondary metal-to-metal seal in the event the O-ring 56 is partially destroyed by fire. The engagement of the lower flange portion 50 of the first valve stem 48 with the O-ring seal 56 in the counterbore 44 limits the upward movement of the first valve stem 48 in the aperture 42.

A handle 58 is connected to the upper end of the first valve stem 48 by a pin 60. The handle 58 includes a flange portion 62 that is engageable with a pair of stop pins 64 (only one is shown) to limit the rotational movement of the handle 58 to approximately 90°. The stop pins 64 are disposed in a pair of holes 66 (only one is shown) in the housing 30. As may be observed in FIGS. 1 and 2, the handle 58, and more particularly the flange portion 62 thereof, will limit the downward movement of the first valve stem 48 in the aperture 42.

A pair of flanges 68 extend outwardly from the housing 30, and two bolt holes 70 are provided extending therethrough.

The housing unit 12, the valve unit 14 and the flanges 16 and 18 are held in assembled relationship by a plurality of threaded bolts 72. In an assembled position, as shown in FIGS. 1 and 2, two of the bolts 72 will extend through the apertures 28 in the flanges 16 and 18, and through the bolt holes 70 in the housing 30, and the remaining bolts 72 will extend around the outer periphery of the housing 30. Each of the bolts 72 is provided with a pair of threaded nuts 74 that engage the flanges 16 and 18, thereby securing the valve assembly 10 in the assembled position.

The valve unit 14 includes a valve body 76, having opposite ends 78 and 80, and having an outer periphery 82 sized to be less in diameter than the bore 36 in the housing 30, for reasons which will be made more apparent hereinafter. The valve body 76 also includes a flange portion 84 formed on the outer periphery 82 adjacent the end 78 of the valve body 76. The flange portion 84 has an end face 86 and an outer periphery 88. The end face 86 is coplanar with the end face 78 of the valve body 76, and the outer periphery 88 is sized to slidingly fit in the counterbore 38 of the housing 30.

The length of the valve body 72, as measured from the end 78 axially to the end 80, is less than the length of the housing 30, as measured from the end 32 axially to the end 34. Therefore, when the valve unit 14 is in the assembled position, as shown more clearly in FIG. 1, the valve body 76 will extend only partially through the bore 36 of the housing 30. The flange portion 84 of the valve body 76 is sized with respect to the counterbore 38 in the housing 30, such that the end faces 78 and 80 of the valve body 76 and the flange portion 84, respectively, will extend axially beyond the end face 32 of the housing 30.

A bore 90 extends through the valve body 76 intersecting the end faces 78 and 80 thereof. A spherically shaped seating surface 92 is formed in a portion of the bore 90 of the valve body 76. One end of the seating surface 92 intersects the end 80 of the valve body 76 and the opposite end of the seating surface 92 intersects the bore 90 in the valve body 76. The spherically shaped seating surface 92 is sized and shaped to matingly and seatingly engage the exterior surface of the valve member, as will be described below.

An annular groove 94 is formed in the spherically shaped seating surface 92, and an O-ring seal member 96 is disposed in the groove 94. The O-ring 96 is sized to sealingly engage a portion of the exterior surface of the valve member about an outer periphery thereof.

Upper and lower apertures 98 and 100, respectively, extend transversely through the valve body 76 intersecting the bore 90, or more particularly the seating surface 92 therein. In a preferred form, as shown in FIGS. 1 and 2, the upper and lower apertures 98 and 100 are radially aligned, for reasons which will be made more apparent hereinafter.

A disc valve member 102 is movably disposed in the bore 90 in the valve body 76. The disc valve member 102 has a hollow, partial hemispherical shape defining a circular shaped edge 103 in one cross section thereof. The disc valve member 102 has an outer periphery 104 which is formed on a curvature having its center generally at the center of the disc valve member 102, along the turning axis thereof.

The outer periphery 104 of the disc valve member 102 is sized, and the disc valve member 102 is disposed in the bore 90 of the valve body 76, such that the outer periphery 104 seatingly and slidingly engages the seating surface 92 formed in the valve body 76. The O-ring seal member 96 is sized to sealingly engage a portion of the outer periphery 104, thereby forming a fluid tight seal therebetween.

The disc valve member 102 has a flat face 106 formed on a portion of the outer periphery 104. The flat portion 106 of the disc valve member 102 is sized such that when the disc valve member 102 has been rotated to the closed position, as shown in FIG. 1, the bore 90 of the valve body 76 substantially encompasses the flat portion 106.

As shown more clearly in FIG. 2, an upper flange 109 is formed on the edge 103 at an upper portion of the disc valve member 102. The upper flange 109 extends axially from the edge 103 when the disc valve member 102 is in the closed position. A lower flange portion 111 is formed on the edge 103 at a lower portion of the disc valve member 102 generally opposite the upper flange 109. The lower flange 111 extends axially from the edge 103 when the disc valve member 102 is in the closed position. An upper aperture 110 extends through the upper flange portion 109, and a lower aperture 112 extends through the lower flange 111. The apertures 110 and 112 are aligned and are disposed, such that in the assembled position, the upper aperture 110 of the disc valve member 102 is aligned with the upper aperture 98 in the valve body 76 and the lower aperture 112 of the disc valve member 102 is aligned with the lower aperture 100 in the valve body 76.

A second valve stem 114 extends downwardly through the upper aperture 98 of the valve body 76, and is journaled therein. A lower portion 116 of the second valve stem 114 extends through the upper aperture 110 of the disc valve member 102. The second valve stem 114 is secured to the disc valve member 102 by a threaded pin 118, which extends through a threaded aperture 120 formed in the upper flange 109 of the disc valve member 102 and into a threaded recess 124 formed in the lower portion 116 of the second valve stem 114.

A rectangular end 126 is formed on the upper most end portion of the second valve stem 114, and is shaped to matingly fit in the slot 52 of the first valve stem 48, thereby providing the interconnection therebetween.

A third valve stem 128 extends upwardly through the lower aperture 100 of the valve body 76, and is journaled therein. An upper portion 130 of the third valve stem 128 extends through the lower aperture 112 of the lower flange portion 111. The third valve stem 128 is secured to the disc valve member 102 by a threaded pin 132, which extends through a threaded aperture 134 formed in the lower flange portion 111 of the disc valve member 102 and into a threaded recess 136 formed in the upper portion 130 of the third valve stem 128.

It is apparent from the foregoing that the disc valve member 102 is journaled in the valve body 76 at upper and lower portions thereof via the second and third valve stems 114 and 128, respectively, and that the disc valve member 102 may be rotated from a fully open to a fully closed position by turning the handle 58 via the interconnection between the first valve stem 48 and the second valve stem 114.

A seal gasket 138 is disposed between the end face 20 of the flange 16 and the end faces 78 and 86 of the valve body 72 and the flange 84, respectively, thereby providing a fluid tight seal therebetween. A second seal gasket 140 is disposed between the end face 22 of the flange 18 and the end face 34 of the housing 30, thereby providing a fluid tight seal therebetween.

OPERATION OF FIGS. 1 AND 2

The valve unit 14 is assembled as a separate unit, and is adapted to be inserted lengthwise into the bore 36 of the housing 30 to a position wherein the flange portion 84 of the valve body 76 abuts the wall 40 formed by the counterbore 38 in the housing 30. In this position, the rectangular portion 126 of the second valve stem 114 will be disposed in the slot 52 of the first valve stem 48. Since the outer periphery 82 of the valve body 76 is less in diameter than the periphery formed by the bore 36 in the housing 30, a chamber 142 will be formed between a portion of the valve body 76 and a portion of the housing 30 when the housing unit 14 is in an assembled position, as shown in FIGS. 1 and 2. The chamber 142 is sized to provide ample space to accommodate the rectangular end 126 of the second valve stem 114 and the lower flange portion 50 of the first valve stem 48.

The flanges 16 and 18 are disposed on opposite ends of the housing unit 12 and the valve unit 14. The valve assembly 10 is held in assembled relationship by the bolts 72, and is secured in this position by the nuts 74, as described before.

The turning movement of the valve handle 58 is transmitted to the disc valve member 102 in a manner described before, so that the disc valve member 102 may be rotated from an open to a closed position. As shown in FIG. 2, the disc valve member 102 has been rotated to a partially open position, and as shown therein the outer edge 103 of the disc valve member 102 will cooperate with a portion of the bore 90 of the valve body 76 to define the fluid passageway through the valve assembly 10.

When the disc valve member 102 has been rotated to the closed position, as shown in FIG. 1, the O-ring seal member 96 will sealingly engage the disc valve member 102 and no fluid will flow through the valve assembly 10.

It is apparent from the foregoing that the valve assembly 10 provides a valve assembly wherein the valve unit 14 may be quickly and easily removed for repair or replacement.

Since the second and third valve stems 114 and 128, respectively, are removably pinned to the disc valve member 102 by the pins 118 and 132, respectively, it is apparent that the disc valve member 102 may be quickly and easily assembled or disassembled from the valve body 76. This facilitates repair or replacement of the valve stems 114 and 128, the O-ring seal member 96, or the disc valve member 102.

It should also be noted that, since the only contacting area between the valve body 76 and the housing 30 is between the flange portion 84 of the valve body 76 and the counterbore 38 of the housing 30, the fact that a certain amount of corrosion may take place therebetween, in actual use of the valve assembly 10, will not greatly affect the ease with which the valve unit 14 may be inserted and removed from the housing unit. It should also be noted that since a sliding fit is not required between the outer periphery 82 of the valve body 76 and the inner periphery formed by the bore 34 of the housing 30, the cost of manufacturing the valve assembly is correspondingly reduced.

The valve assembly described before also provides a valve assembly wherein the valve unit is insertable and removable for repair or replacement, thereby reducing downtime encountered during field repair of the valve assembly 10.

EMBODIMENT OF FIGS. 3 AND 4

The valve assembly 10a, shown in FIGS. 3 and 4, is constructed in the same manner as the valve assembly 10, shown in FIGS. 1 and 2, except as described below.

The housing 30a has a flange portion 150 formed on end 34 thereof. The flange portion 150 extends radially inwardly and about the periphery of the bore 36 of the housing 30a. The end face of the flange portion 150 is coplanar with the end face 34 of the housing 30a, and provides an additional contacting area between the end face 22 of the flange 18 and the housing 30a. This type of construction may be desirable in some applications, particularly those involving high pressure.

The valve body 76a does not have a seating surface formed therein, such as the seating surface 92 in the valve body 76, shown in FIGS. 1 and 2, for reasons to be made apparent below. A counterbore 152 is formed in the valve body 72a intersecting the end 80 thereof, and an additional counterbore 154 is formed in the counterbore 152 intersecting the bore 90 in the valve body 76a. The upper and lower apertures 98a and 100a, respectively, are identical to the upper and lower apertures 98 and 100, shown in FIG. 1 and 2, except the upper and lower apertures 98a and 100a intersect the counterbore 152 in the valve body 76a.

An annular seat 156, having a valve member end 158 and a non-valve member end 160 is disposed in the counter bore 154 of the valve body 76a. The seat 156 may be constructed of a metal or an elastomeric material. The outer periphery of the seat 156 is sized to slidingly fit in the counterbore 154 of the valve body 76a.

A seating and sealing surface 162 is formed on a portion of the valve member end 158 of the annular seat 156. The seating and sealing surface 162 is sized and positioned in the valve body 76a to sealing engage a portion of the exterior surface of the disc valve member, as will be described below.

The disc valve member 102a is constructed similar to the disc valve member 102, shown in FIGS. 1 and 2, except the disc valve member 102a does not have a flat portion formed thereon, but rather is spherically shaped over a major portion of the outer periphery 104a thereof.

A raised portion 166 is formed on the outer surface of the upper flange portion 109a around the upper aperture 110a in the disc valve member 102a. The raised portion 166 has an outer end 168 sized and positioned to bearingly contact the adjacent portion of the counterbore 152 in the valve body 76a when the disc valve member 102a is in the assembled position. A second raised portion 170 is formed on the outer surface of the lower flange portion 111a around the lower aperture 112a in the disc valve member 102a. The raised portion 170 has an outer end 172 sized and positioned to bearingly contact the adjacent portion of the counterbore 152 in the valve body 76a when the disc valve member 102a is in the assembled position.

The upper portion 130a of the third valve stem 128a slidingly extends into the lower aperture 112a of the lower flange portion 111a, but is not secured therein. The third valve stem 128a extends through the lower aperture 100a, and a lower portion 174 thereof is sized to extend beyond the outer periphery 82 of the valve body 76a, and in an assembled position, the lower most end 174 thereof bearingly contacts the bore 36 of the housing 30a. It is apparent from the foregoing that the third valve stem 128a is supported in the valve body 76a and the disc valve member 102a by the housing 30a.

OPERATION OF FIGS. 3 AND 4

The valve assembly 10a will operate substantially like the valve assembly 10 shown in FIGS. 1 and 2. The valve unit 14a is assembled as a separate unit, and is adapted to be inserted axially into the housing unit 12a.

The salient differences between the valve assembly 10 and the valve assembly 10a include the manner in which the disc valve member 102a is supported in the valve body 30a; the third valve stem 128a being supported by the housing 30, and thus not pinned in the disc valve member 102a; the fact that a seating surface is not formed in the valve body 76a, but rather a removable valve seat 156 is provided therein; and that the disc valve member 102a is spherically shaped about a major portion of the outer periphery 104a thereof.

As the disc valve member 102a, is rotated from the open to the closed position, the only portions thereof which contact the valve body 76a are the outer ends 168 and 172 of the raised portions 166 and 170, respectively. Therefore, the total contacting area between the disc valve member 102a and the valve body 76a is reduced as compared to the valve assembly 10. This is particularly desirable when handling fluids containing foreign particles which might become trapped between the disc valve member and the seating surface, or in the handling of corrosive fluids.

It is apparent from the foregoing that the valve assembly 10a retains all of the advantages of the valve assembly 10 with respect to the particular construction of the second valve stem and the disc valve member, and with respect to the inner periphery of the bore in the housing being sized larger than the outer periphery of the valve body.

Changes may be made in the construction and arrangement of parts or elements of the various embodiments as disclosed herein without departing from the spirit and scope of the invention.

What is claimed is:

1. A valve assembly for controlling the flow of fluid between a pair of aligned pipe flanges comprising:
   a housing unit, including:
      a housing having opposite end faces and a bore extending therethrough;

bolt means supporting the housing between the flanges;

a first valve stem having an upper and a lower end, journaled in the housing; and a valve unit, including:

a valve body extending lengthwise into the housing having opposite end faces and a bore extending therethrough intersecting said opposite end faces, the major portion of the outer periphery of said valve body having a diameter less than the diameter of the bore in the housing;

means supporting the valve body in the housing;

a hollow substantially hemispherically shaped disc valve member having an outer edge therearound, in the bore of the valve body for opening and closing the valve assembly;

a second valve stem secured to the disc valve member having an upper and a lower end portion and being journaled in the valve body, said upper end being connected to the first valve stem for transmitting the movement of the first valve stem to the disc valve member;

a third valve stem having an upper and lower end, said third valve stem being connected to the disc valve member and journaled in the valve body; and seat means disposed in the valve body sealingly engaging a portion of the disc valve member when the disc valve member is in the closed position.

2. The valve assembly of claim 1 wherein the seat means includes an annular elastomeric seat ring disposed in the bore of the valve body, said seat ring having a seating and sealing surface formed on a portion thereof, said seating and sealing surface seatingly and sealingly engaging a portion of the outer periphery of the disc valve member.

3. The valve assembly of claim 1 wherein the valve body is further defined to include a spherically shaped seating surface formed in a portion of the bore thereof, said seating surface seatingly and slidingly contacting a portion of the outer periphery of the disc valve member.

4. The valve assembly of claim 3 wherein the valve body is further defined to include an annular groove formed in the seating surface; and an O-ring seal member disposed in said groove, said O-ring seal member sealingly engaging a portion of the exterior surface of the disc valve member about an entire periphery thereof.

5. The valve assembly of claim 1 wherein the housing includes a counterbore adjacent one end thereof; and wherein the means supporting the valve body in the housing includes a flange portion on one end of the valve body extending radially therefrom, said flange portion matingly fitting in said counterbore, thereby positioning the valve body in the housing.

6. The valve assembly of claim 1 wherein the means supporting the valve body in the housing includes a flange portion on the valve body having an end face surface extending radially therefrom, said flange portion cooperating with said housing and one of said flanges to support and position the valve body in the housing.

7. The valve assembly of claim 6 wherein said flange portion is sized such that the end face surface thereof facing away from the valve body protrudes beyond the adjacent end face of the housing when the valve body is inserted in the housing.

8. The valve assembly of claim 7 wherein the length of the valve body between the end face surface of the flange portion and the opposite end face of the valve body is less than the length of the housing between the opposite ends thereof.

9. The valve assembly of claim 1, wherein the disc valve member is defined further to include, an upper flange portion having an outer periphery and an aperture extending therethrough, said upper flange being formed on the outer edge of the disc valve member and extending generally axially therefrom when the disc valve member is in the closed position, said aperture slidingly receiving the lower end portion of the second valve stem.

10. The valve assembly of claim 9 wherein the disc valve member is defined further to include the lower flange portion having an outer periphery and an aperture extending therethrough, said lower flange being formed on the outer edge of the disc valve member and extending generally axially therefrom when the disc valve member is in the closed position, said aperture slidingly receiving the upper portion of the third valve stem.

11. The valve assembly of claim 10 wherein the lower end portion of the third valve stem extends radially from the outer periphery of the valve body and bearingly contacts the bore of the housing, said third valve stem being thereby supported in position by the housing.

* * * * *